(12) United States Patent
Hutchison et al.

(10) Patent No.: US 7,315,749 B2
(45) Date of Patent: Jan. 1, 2008

(54) CASTING FOR PORTABLE COMMUNICATION DEVICE

(75) Inventors: Mark Hutchison, Headley (GB); Cedric Allum, High Wycombe (GB)

(73) Assignee: Vertu Limited, London (GB)

( * ) Notice: Subject to any disclaimer, the term of this patent is extended or adjusted under 35 U.S.C. 154(b) by 182 days.

(21) Appl. No.: 10/451,965

(22) PCT Filed: Dec. 28, 2001

(86) PCT No.: PCT/GB01/05635

§ 371 (c)(1),
(2), (4) Date: Dec. 12, 2003

(87) PCT Pub. No.: WO02/054720

PCT Pub. Date: Jul. 11, 2002

(65) Prior Publication Data

US 2004/0092283 A1    May 13, 2004

(30) Foreign Application Priority Data

Dec. 29, 2000    (GB) ................................. 0031816.2

(51) Int. Cl.
*H04M 1/00*    (2006.01)
(52) U.S. Cl. .............................. 455/550.1; 455/575.1; 455/575.8; 455/128
(58) Field of Classification Search ............. 455/575.1, 455/575.4, 566, 550.1, 575.8, 347, 556
See application file for complete search history.

(56) References Cited

U.S. PATENT DOCUMENTS

| | | | |
|---|---|---|---|
| 5,659,612 A * | 8/1997 | Wang ........................ 379/446 |
| 5,661,634 A | 8/1997 | Obata et al. ................. 361/684 |
| 5,925,847 A | 7/1999 | Rademacher et al. ..... 174/35 R |
| 5,931,764 A | 8/1999 | Freeman et al. ............... 482/4 |
| 5,974,333 A * | 10/1999 | Chen ........................ 455/569.2 |
| 6,084,963 A * | 7/2000 | Hirai et al. ................. 379/446 |
| 6,809,660 B2 * | 10/2004 | Bestle ......................... 341/20 |
| 2003/0008679 A1 * | 1/2003 | Iwata et al. ................. 455/556 |
| 2003/0194974 A1 * | 10/2003 | Curtis et al. ............... 455/90.1 |

FOREIGN PATENT DOCUMENTS

| | | |
|---|---|---|
| DE | 8304706 U1 | 7/1983 |
| DE | 4401683 A1 | 7/1996 |
| EP | 0610689 A1 | 8/1994 |
| EP | 0781080 A1 | 6/1997 |
| FR | 2737837 A3 | 2/1997 |
| GB | 2064879 A | 6/1981 |
| GB | 2331888 A | 6/1999 |
| GB | 2339993 A | 2/2000 |
| GB | 2346759 A | 8/2000 |
| JP | 57-986 | 5/1955 |
| JP | 60-152977 | 8/1985 |
| JP | 7-58476 | 3/1995 |
| JP | 11-87940 | 3/1999 |
| JP | 11-341131 | 12/1999 |

* cited by examiner

*Primary Examiner*—Duc M. Nguyen
*Assistant Examiner*—Dai Phuong
(74) *Attorney, Agent, or Firm*—Harrington & Smith, PC

(57) ABSTRACT

The invention relates to a casing for a portable communication device. The casing has an opening face carrying user input elements and a display, and rails are located against movement relative to a spacing element to strengthen the casing against flexing.

20 Claims, 10 Drawing Sheets

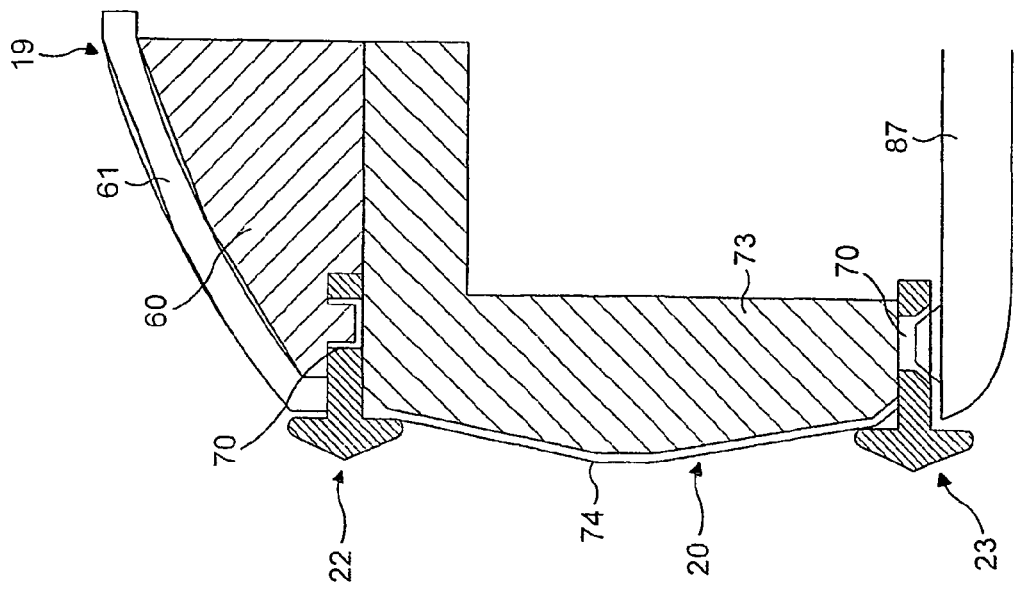
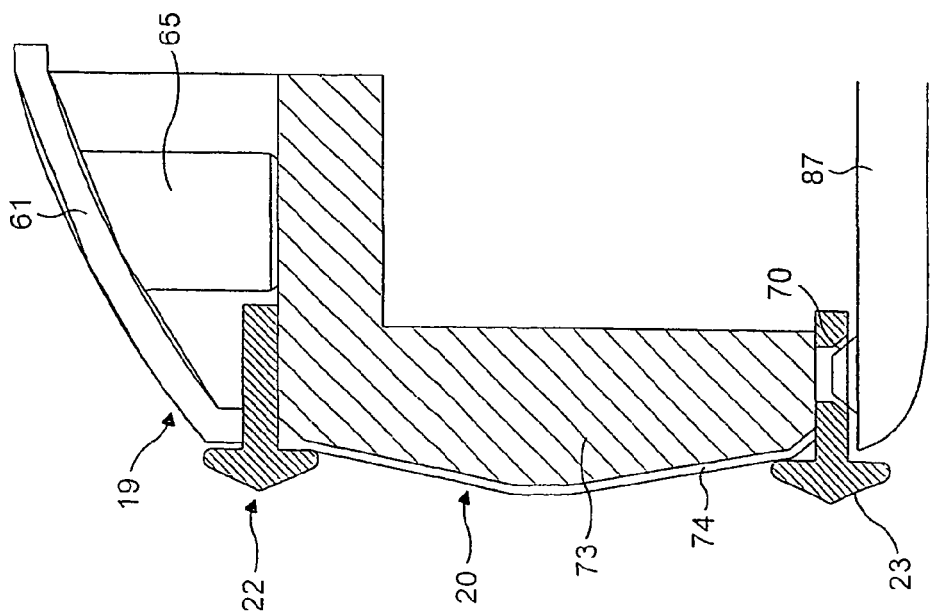

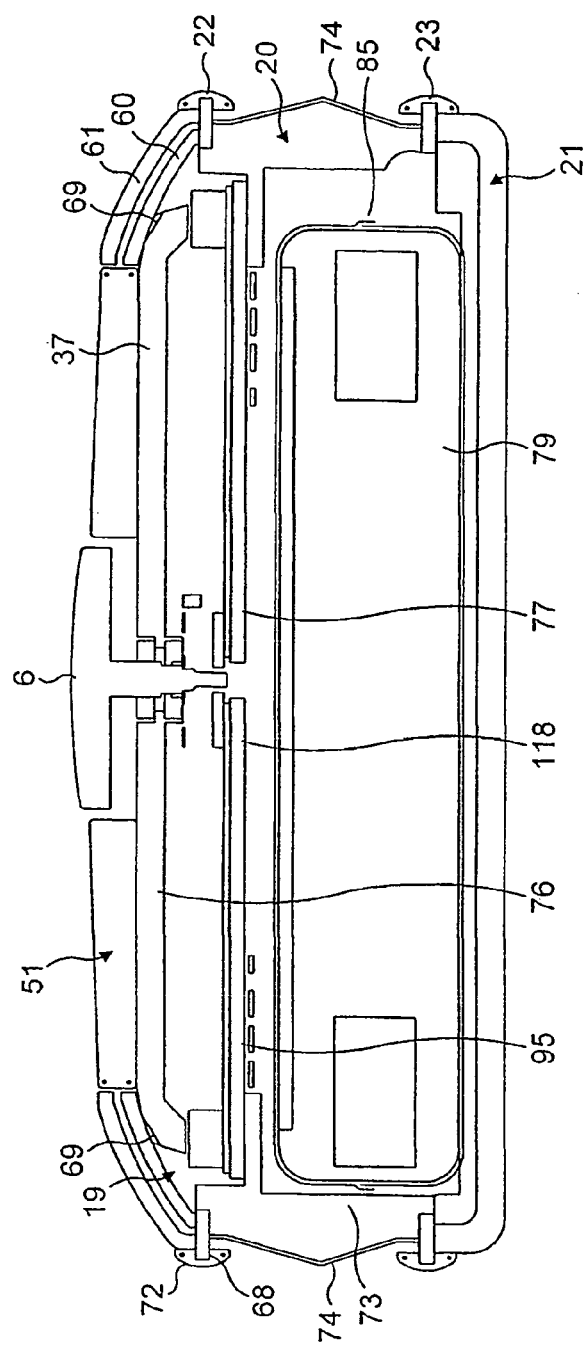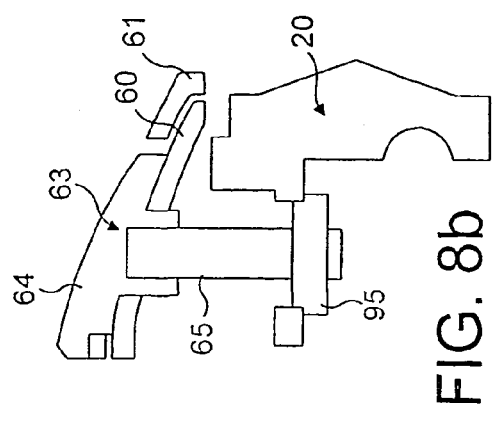

CASTING FOR PORTABLE COMMUNICATION DEVICE

FIELD OF THE INVENTION

The invention relates to personal communications devices and housings for such devices.

BACKGROUND OF THE INVENTION

Over recent years, personal communications devices ranging from mobile phones to electronic diaries and beyond have moved from being elite items to everyday tools. In all these years, however, the design criteria for the casing for the pieces of equipment have not really changed.

Communications devices of this type have casings designed with ease of assembly, durability, and cost, amongst other things in mind. From the first, casings have typically been formed from moulded parts as these lend themselves particularly to automated manufacture and can be easily automatically clipped together for assembly. The plastic materials used are also relatively flexible and consequently resilient against the knocks and drops that will inevitably be encountered by a highly utilized personal portable device. The design criteria have led to similar types of casing being used for all such devices.

SUMMARY OF THE INVENTION

In accordance with one aspect of the present invention there is provided a casing defining an internal space for accommodating the engine of a portable communication device the casing having an operating face for carrying user input elements, and comprising a pair of strengthening members located against movement relative to, and separated by, a spacing element, such that the casing is strengthened against deflections.

The invention provides a mechanism for strengthening the casing that will provide security particularly against longitudinal flexibility, which for a hand held device that is typically longer in longitudinal than lateral extent can cause problems when brittle materials are used in forming the casing. This is particularly the case when at least some of the materials from which the casing is formed are not flexible and may instead be relatively brittle.

By fixing a pair of strengthening members against movement relative to the spacing element located between them, significant improvement in strength is achieved against flexing or bending in the plane of the spacing element. It also provides some increase in strength against twisting. The strength of the assembly is related to the separation distance. The strength tends to increase with separation distance provided the separator has sufficient strength to maintain the relative position of the pair of members. By separating the strengthening members, the minimum bend will occur between the two elements increasing the compression of the member on the inside of the bend and the expansion of the member on the outside of the bend for any given bend. This will be the effect provided there is no slippage between the strengthening members and the spacing element. This could occur as a result of one sliding against the other or one bending away from the other. The connection or connections holding the spacing element against movement relative to the pair of strengthening members should be strong enough to maintain the connection across the range of bending forces to be resisted.

The force necessary to bend a pair fixed against movement relative to the spacing element is substantially greater than the force required to bend each individually. The whole assembly is stronger because to allow the assembly to bend the strengthening members will need to stretch or compress along their length.

The casing will generally have a longitudinal and a lateral extent. The longitudinal extent may be significantly greater than its lateral extent. Under these circumstances, to impede longitudinal flexing or bending in the plane of the operating face, the strengthening members preferably run parallel to the plane of the operating and rear faces. The pair of strengthening members are then preferably separated in a plane transverse to the plane of the operating face. The plane of the spacing element may define the plane in which flexing of the casing is inhibited.

The strengthening members may be, amongst other things, bars, rods or plates. Elongate strengthening members may extend around part or all of the casing. The greater the extent of the strengthening member the greater the area of the casing protected against bending or flexing. Preferably both long edges of the casing are protected. By providing elongate strengthening members around the full extent of the casing, the casing is protected against lateral and longitudinal flexing.

If the strengthening members are located on the periphery of the casing, the strengthening members can additionally obscure the edges of housing elements forming the casing from view on the exterior of the assembled housing.

The strengthening members may be rails that may be continuous, or broken at discrete points, around the perimeter of the casing. The rails are suitably sandwiched between respective casing elements and pinned in position to prevent one sliding over the other. The strengthening members may be attached directly to the separating element or may be attached to other elements of the casing that are fixed relative to the separating element. The strengthening member, will, in many embodiments, trace the periphery of the casing to strengthen all parts of the casing. Embodiments of the invention can, however, be used to strengthen specific areas of the casing if desired. Breaks in a rail, for example, tracing the periphery of the casing would then be tolerable.

In embodiments where the housing members comprise a front face, a rear face and a side member for displacing the front and rear faces to create the internal space, a strengthening member may be located at the intersection between the front face and the side member and/or the side member and the rear face. The pair of strengthening members can then be readily located one on either side of the side member and secured against movement relative to the side member.

The casing may be a conventional one part casing or a clamshell, or other two part arrangement, where the user input elements or keys may be located on a different face to a display. In such two part arrangements generally respective casing portions are fixed such that one is movable relative to the other. The movement may be rotational or lateral.

BRIEF DESCRIPTION OF THE DRAWINGS

Embodiments of the invention will now be described in more detail with reference to FIGS. 1 to 10 of the accompanying drawings of which:

FIGS. 7a and 7b are sections through the rails of FIG. 1 showing the connection to the side casing;

FIGS. 8a and 8b are sections through the communication device of FIG. 1 in the battery region;

DETAILED DESCRIPTION

Figure 1:
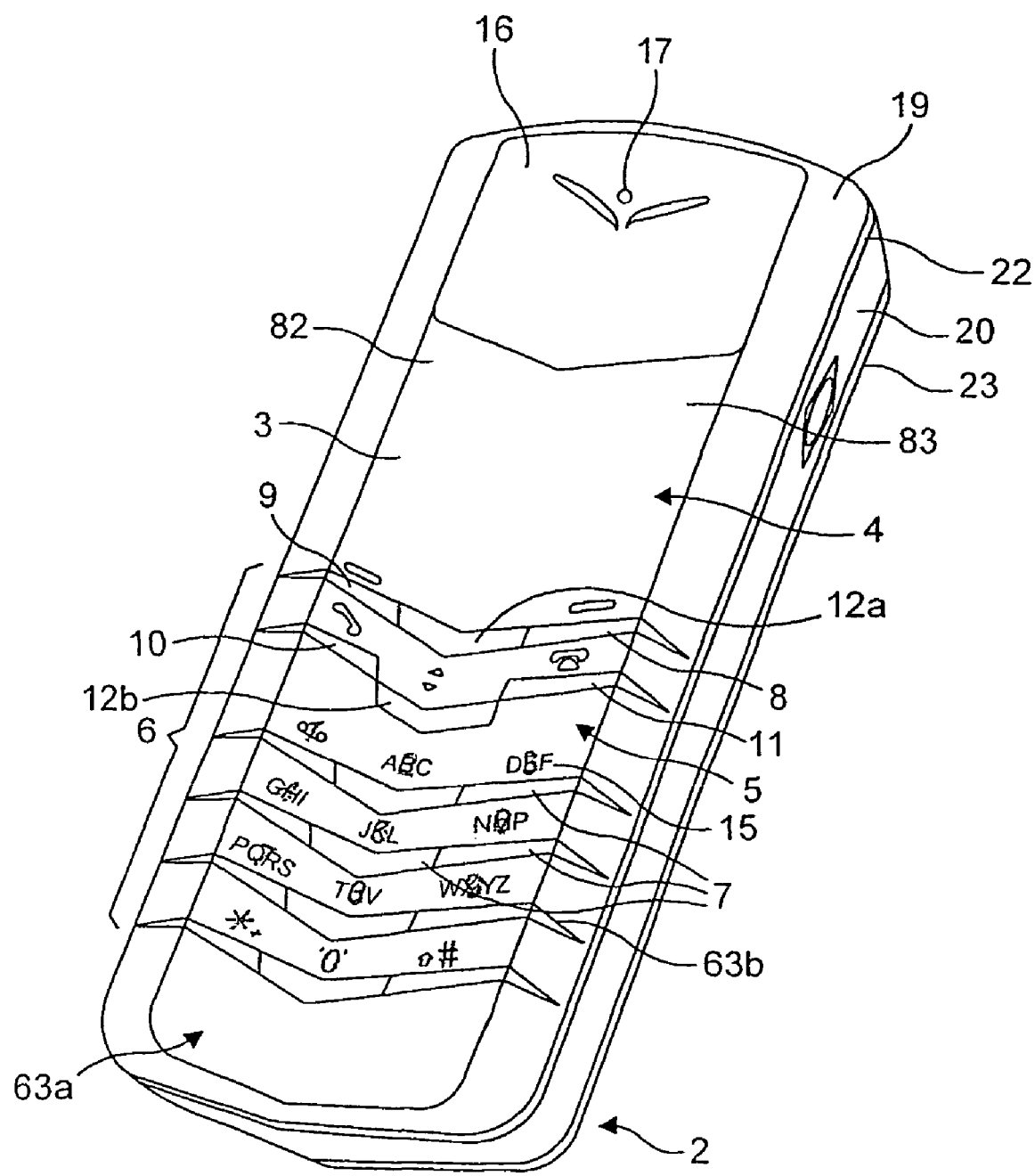
FIG. 1 is a perspective view of a communication device showing one embodiment of the invention.
Figure 2:
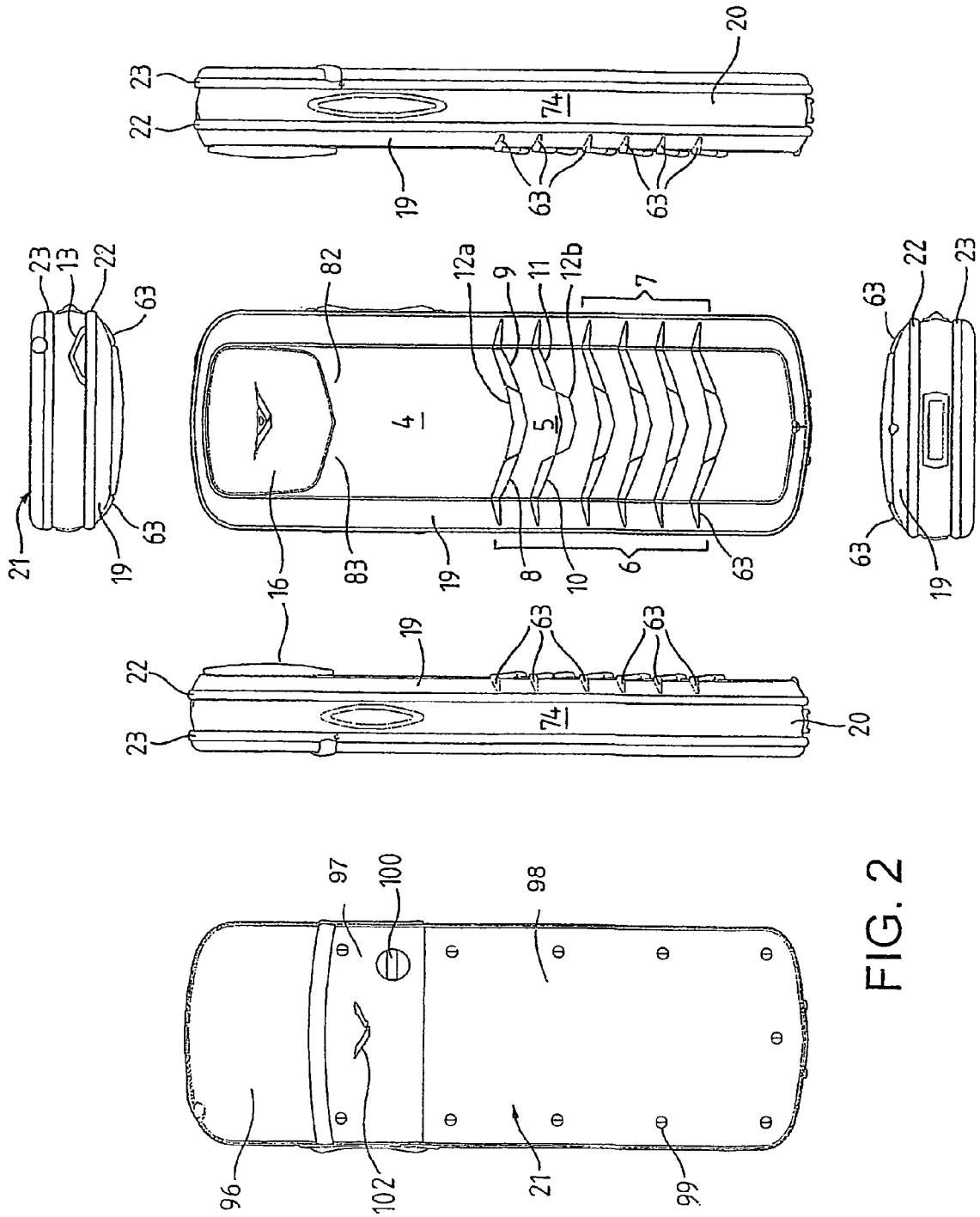
FIG. 2 shows front, rear, sides and top views of the communication device of FIG. 1.

The embodiment illustrated in FIG. 1 is a handheld communication device 1 with a precious retainable casing 2. The casing 2 of the device has been designed to be customizable to individual taste with precious materials. To enable individual devices to be created, the number of external parts from which the casing is formed is relatively large in contrast to existing communications devices.

The casing 2 has an optically permeable front face 3 providing a seamless transition from a display region 4 to an input region 5 that includes a key array 6. The key array 6 includes a first group of alphanumeric keys 7, for entering telephone numbers, writing text messages (SMS), writing names (associated with phone numbers), etc. Each of the twelve alphanumeric keys 7 is provided with a figure "0-9" or a sign "#" or "*", respectively. In an alpha mode each key is associated with a number of letters and special signs used in text editing. The key array 6 additionally comprises two soft keys 8, 9, two call handling keys 10, 11, two scroll keys 12, and an on/off key 13.

The functionality of the soft keys 8, 9 may depend on the state of the communication device and position within the menu accessed using the scroll keys 12. The current functionality of the soft keys 8, 9 can be shown in separate fields in the display region 4 just above the respective keys 8, 9.

The two call handling keys 10, 11 are used for establishing a call or a conference call, terminating a call or rejecting an incoming call.

The two direction keys or scroll keys 12, in the handset illustrated are placed centrally on the front surface of the communication device between the display region 4 and the group of alphanumeric keys 7 perform a scrolling function.

The seamless face 3 is formed from an optically seamless light guide 14 providing light to illuminate the display region 4 and key legends 15 located on the light guide 14 and associated with individual keys of the key array 6.

The front face 3 is overlaid with a pillow 16 providing apertures 17 to channel sound from a loud speaker 18 and providing an appropriate feel for an element of the device that will be located close to the user's ear. The front face 3 is surrounded by a bezel 19 that can be made from a precious metal. This acts to protect the edges of the light guide 14 and can help in some embodiments in securing the elements of the casing 2 together.

The keys of the key array in this particular embodiment are arranged to provide particular sensory guidance to the user. Aspects of the design also allow the light guide 14 to be made from a wide range of materials including those that are brittle and so need to be carefully handled and protected from shattering.

The casing 2 is formed from the front face 3 surrounded by the bezel 19, a side frame 20 and a back cover 21. The interface between the side frame 20 and the bezel 19 and the side frame 20 and the rear cover 21 are shielded by rails 22, 23 in this embodiment. The rails 22, 23 hide raw edges from view and exposure to ensure that the device 1 is both long lasting and elegant. The construction of the casing 2 enables the casing 2 to be opened with ease to update the engine 24 inside when desired. The casing 2 is also designed to allow the device to accommodate different sized and shaped engines 24, which may be necessary through its life.

Other elements of the design will be discussed in greater detail with reference to the later drawings. By way of introduction, the device will be briefly discussed with reference to its functional elements.

Figure 3:
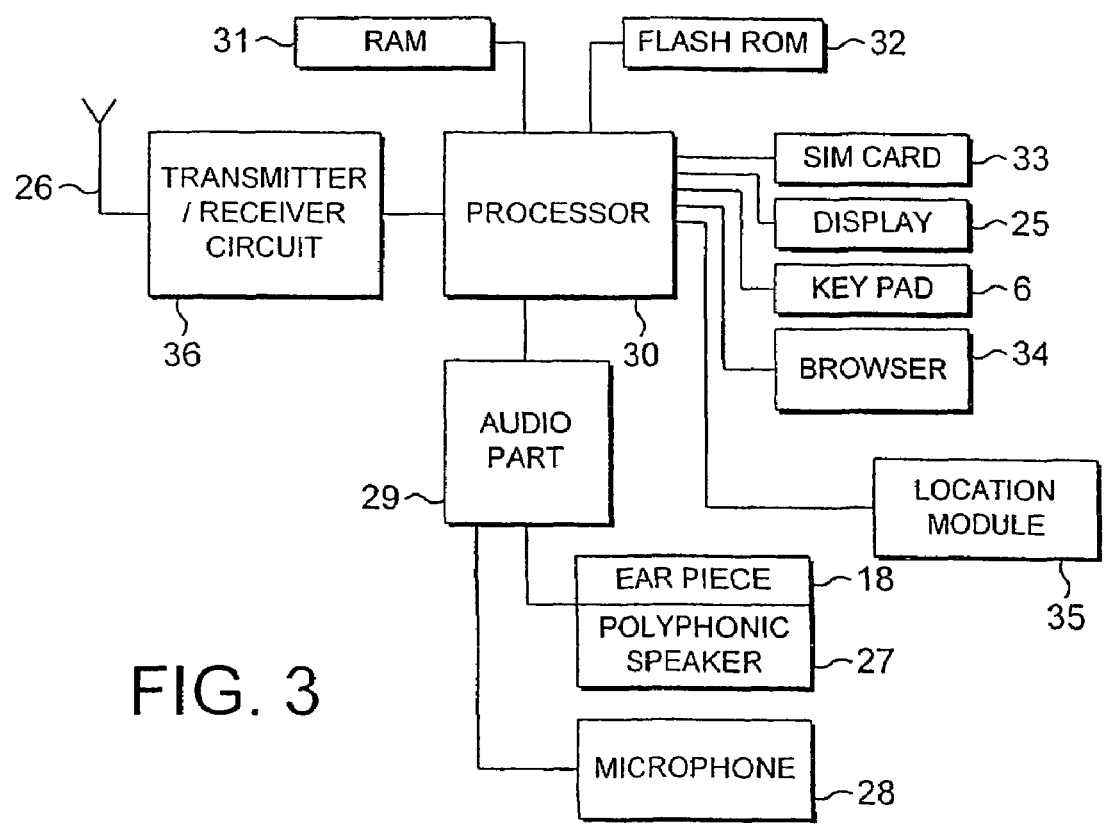
FIG. 3 is a schematic representation of a communication device suitable for embodiments of the present invention.

The communication device 1, includes the key array 6, a display 25, an antenna 26, an ear piece speaker 18, a polyphonic speaker 27, and a microphone 28. The communication device 1 is adapted for communication via a wireless telecommunication network, e.g. a wireless network. However, the communication device could also have been designed for a cordless network. FIG. 3 shows schematically and functionally elements of the communication device 1. The microphone 28 records the user's speech, and the analogue signals formed thereby are A/D converted by an A/D converter before the speech is encoded in an audio part 29. The encoded speech signal is transferred to processor 30. The processor 30 may support software in the phone. The processor 30 also forms the interface to peripheral units of the apparatus. These may include a Random Access Memory (RAM) 31 and a Flash Read. Only Memory (ROM) 32, a SIM card 33, the display 25, and the key array 6, and perhaps a browser application 34, and a location module 35.

The browser application 34 can be used to request and receive information from the Internet. The location module 35 enables the terminal 1 to determine its current position.

The processor 30 communicates with a transceiver 36, e.g. a circuit, which is adapted to send and receive messages in a telecommunication network. The telecommunications network may be a GSM network, but the invention may also be applied in connection with other networks, such as other kinds of wireless networks and various forms of cordless phone systems or in dual band phones accessing sets of these systems or networks. The audio part 29 speech-decodes the signal, which is transferred from the processor 30 to the earpiece 18 via a D/A converter.

The embodiment illustrated in FIG. 1 has a light permeable front face 3 that can be formed from sapphire or a similar precious stone. Sapphire has properties including its scratch resistance and optical clarity that make it suitable for use in this context. The light guide provides a suitable external surface to the device. Other materials such as glass or ceramic materials or other minerals and precious stones could, however, also be used in combination with, or instead of, sapphire. As soon as a mineral such as sapphire is used in place of other more flexible light permeable materials such as plastics, additional problems are introduced associated with the characteristics of the material. In designing a durable device having, for example, a brittle material for a front piece 3 there are many difficulties, in particular it is useful to increase the flexibility of the front face and reduce flexing of the front face.

Figure 4:
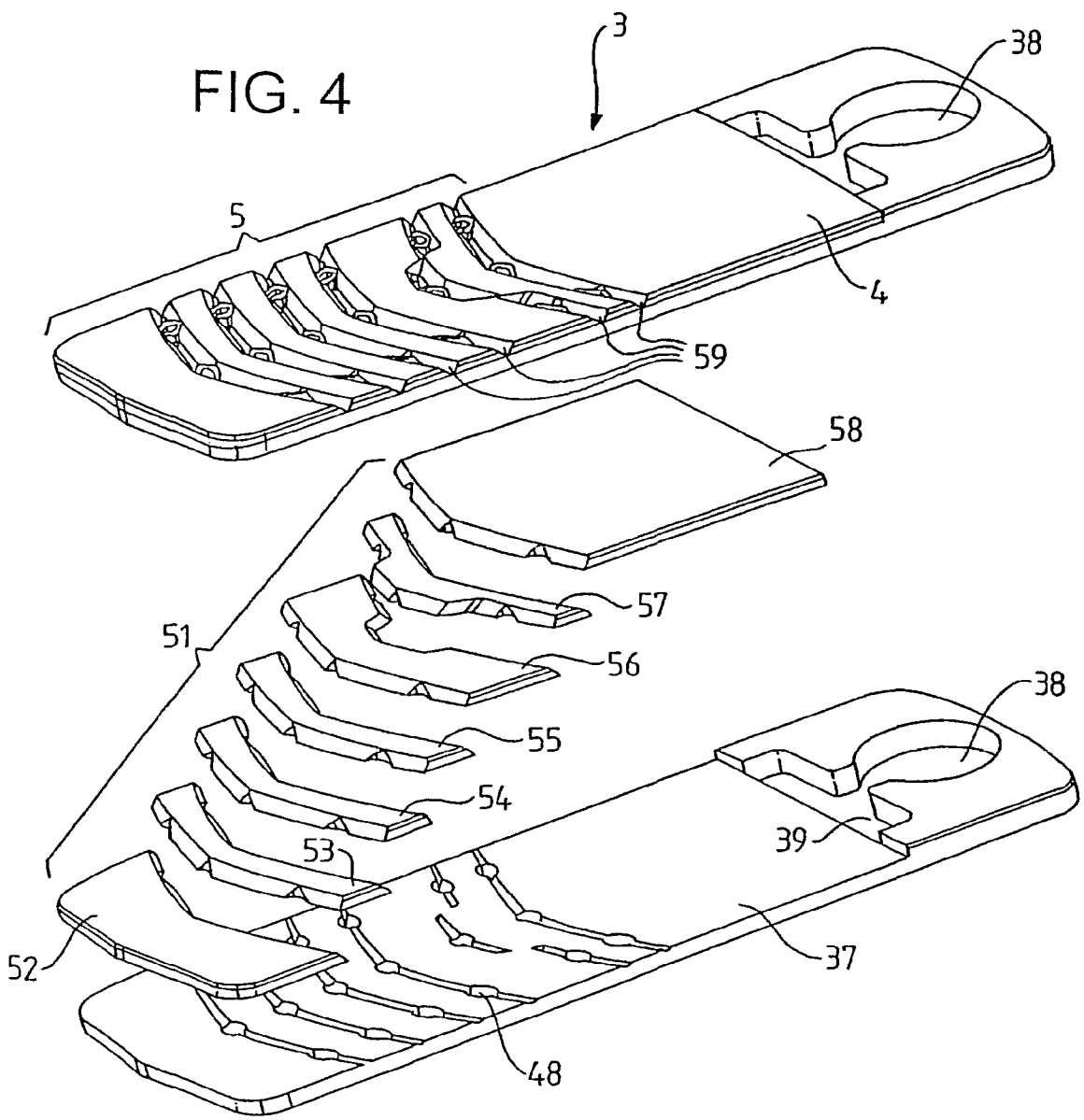
FIG. 4 is an exploded view of the face of a communication device of one embodiment of the invention without keys.
Figure 5:
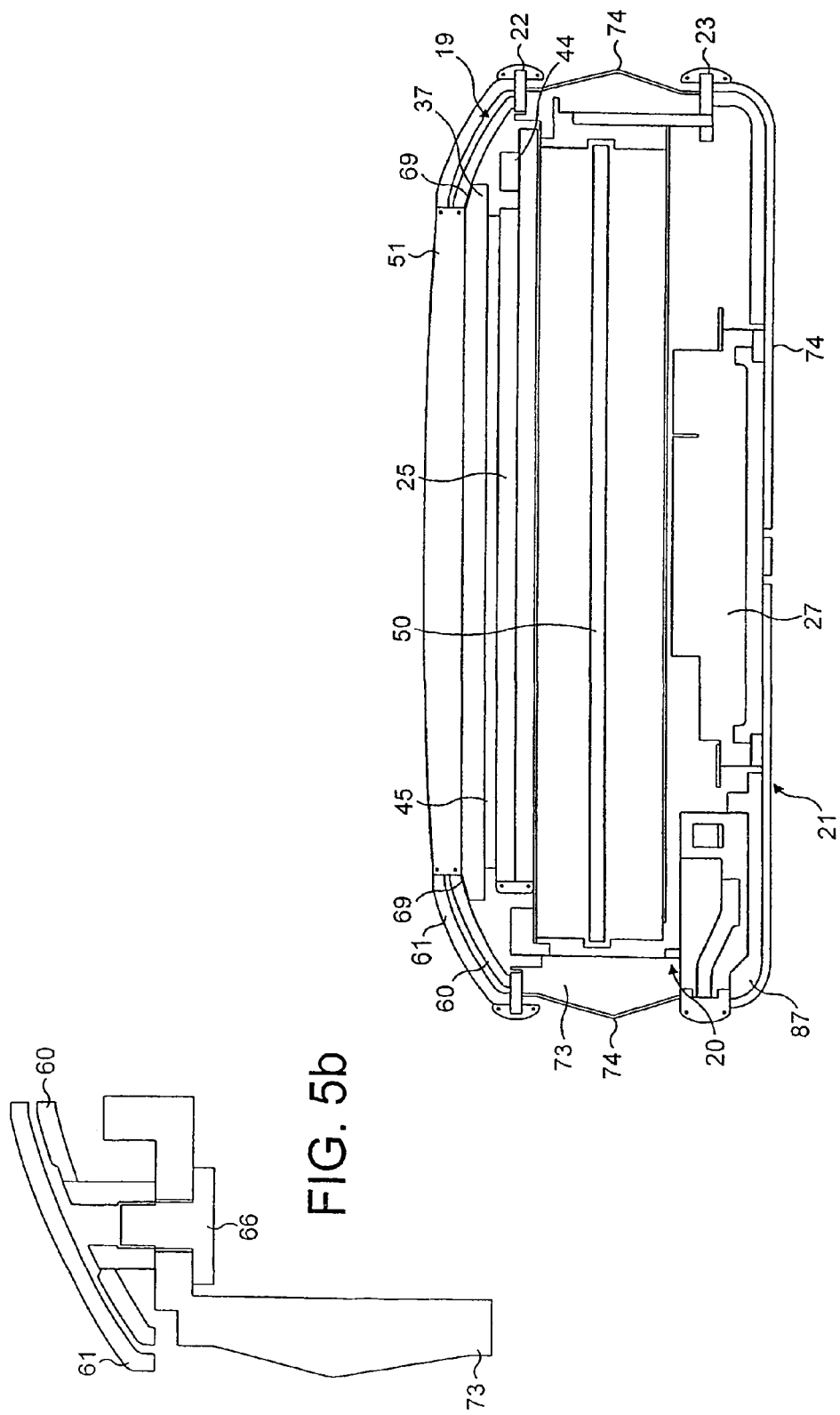
FIGS. 5a and 5b are sections through the communication device of FIG. 1 in the display region.

As can be seen most clearly from FIG. 4, the second layer of the composite light guide 51 is made in a number of sections 52-58. This enhances flexibility allowing brittle materials to be used for the second layer 51. In the embodiment illustrated all brittle parts are bonded to a carrier formed from e.g. plastic or titanium in order to better absorb shock. In the embodiment described, the sapphire is formed in individual sections 52-58 for ease of manufacture.

In order to increase the durability of the composite light guide 14 and strengthen it against damage, the sections 52-58 are adhered to a more flexible perspex layer 37 that has a cut-out 38 for accommodating the ear piece speaker 18 that is optimized for use close to the ear. There is another cutout accommodating a light pipe diffuser 39. The sections are adhered to the perspex layer 37 leaving gaps 59 extending across the entire width. These gaps 59 act as hinges to allow the composite layer 14 to be relatively flexible along its major axis. In the embodiment illustrated, the layout of the key array 6 has been designed with this in mind. The alphanumeric keys 7 are arranged in groups of three extending across the whole width of the second layer of the composite 51. The function keys or soft key 8, 9 are also arranged in two groups of three. The soft keys 8, 9 and the top scroll key 12a follows the line of the alpha numeric keys 7. The call handling keys 10, 11 and the bottom scroll key 12b, which is displaced from the line of the others, defines the lower edge of one of the elements 57 and the upper edge of another of the elements 56. This makes the second row of keys 10, 11, 12b distinctive whilst still avoiding problems in manufacture of the elements 52-58.

Although the embodiment described is designed with a brittle material such as sapphire in mind, the resultant arrangement could be formed from any number of other materials including plastics that provide the required optical characteristics. Similarly different key arrangements could be used without departing from individually inventive concepts that are disclosed.

When using a brittle material for a front face light guide 14 problems are also encountered when connecting the front face 3 to the rest of the casing elements. In the illustrated embodiment the edges of the brittle elements 52-58 are protected by the bezel 19 that sits around the whole of the face. The bezel 19, in this embodiment, is formed from a bezel support 60 overlaid with a 0.5 mm thick metal sheet, the bezel cover 61. The metal sheet 61 is bonded to the bezel support 60, that may be formed from plastic, with an adhesive such as a two part epoxy adhesive or a two part acrylic adhesive. As the metal sheet 61 is relatively thin this keeps the weight of the casing 2 down and also allows relatively precious metals such as titanium or gold to be used at relatively lower cost. The bezel 19 could, however, be a single part and/or be formed from a single material for example titanium.

The transparent face 3 in this particular embodiment is securely held in place by a robust mechanism. The perspex layer 37 to which the elements 52-58 are bonded extends beyond the area covered by the elements to provide a lip or edge 62 around the whole of the composite light guide 14. This edge 62 is used to secure the front face 3 in position as it is tucked under the bezel 19 that defines the perimeter of the front face and squeezed between the bezel 19 and the side frame 20.

As can be seen in FIG. 1, the bezel 19 is punctuated with front face protectors 63 whose function will be described in more detail later. These front face protectors 63, in this particular embodiment play a role in holding the casing elements together.

The front face protectors 63 have a tip part 64 that extends over the bezel 19 and a shaft 65 that passes through the bezel 19 and into the plastic side frame 20. The shaft 65 may be tightened onto the frame 20 using a nut 95. In this case the nut stops the front face protectors from falling out of the device. In one embodiment the shafts 65 are screwed into the tips 64 at one end and into the side frame element 20 at the other although other manners of connection could be employed. The shaft 65 and tip 64 could also be one piece rather than two. The bezel 19 and the perspex layer 37 of the transparent face 2 are captured by the front face protector 63 and side frame element 20 as can be seen in FIG. 8B. The front face protectors 63 accordingly grip the transparent face 3 securely between the side frame 20 and the bezel 19. The front face protectors 63 are only located next to the key array 6. In order to secure the transparent face 3 around its perimeter additional screws 66 are added to draw the bezel 19 towards the side frame 20 and squeeze the transparent face 3 in place. In one embodiment, the screws 66 thread through the side frame 20 and tap into the bezel support 60. Once the bezel support 60 is secured to the side frame 20 the outer shell 61 of the bezel 19 can be adhered to the support 60 to hide the tapped screw ends 66. Alternatively the bezel 19 is stuck to the support first (a sub-assembly) and this sub-assembly is then screwed to the frame.

As can be seen in the figures, although the more flexible transparent substrate 37 is overlaid by the bezel 19 secured in position by the front face protectors 63 and other connectors, the sapphire is maintained spaced from the bezel 19 so that it is protected from chipping or other damage as a result of contact. The edges of the sapphire elements do not protrude above the edge of the bezel 19 to provide further protection for the more vulnerable edges. In the arrangement described, the transparent face 3 is gripped in position between the bezel 19 and the side frame 20. The more flexible substrate 37 could, however receive screws or other fasteners to located it relative to the other frame members without damaging the more brittle sapphire layer.

To reduce the ingress of dirt or fluids a sealant 69 is located between the bezel 19 and the transparent face 3. One way in which this can be introduced is to paint a seal on the underside of the bezel 19 which when dry is compressed between the transparent light guide 14 and the bezel 19 when the bezel 19 and the side frame 20 are pulled together.

Figure 6:
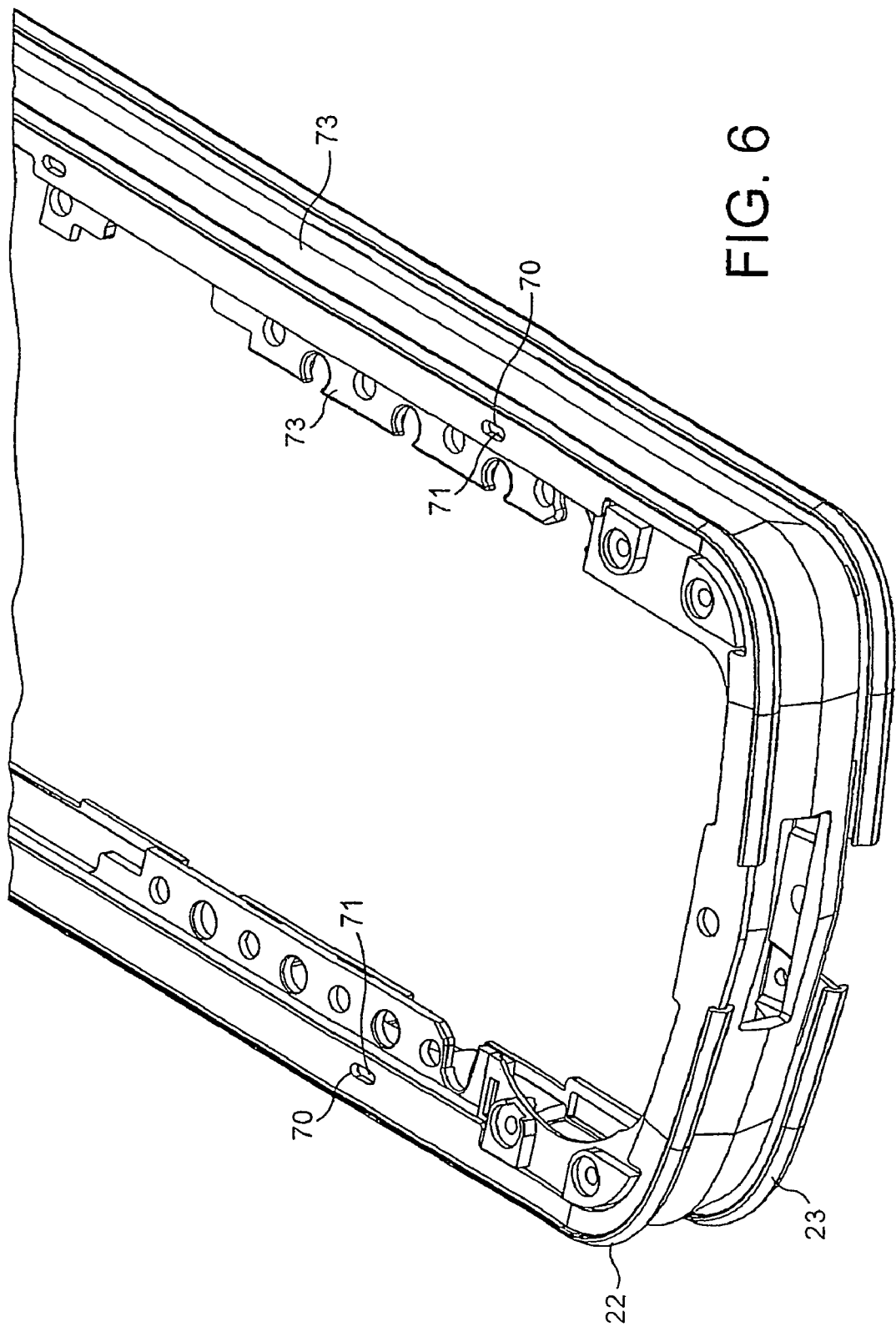
FIG. 6 is a perspective view of a side frame element and located rails for constructing a casing
Figure 9:
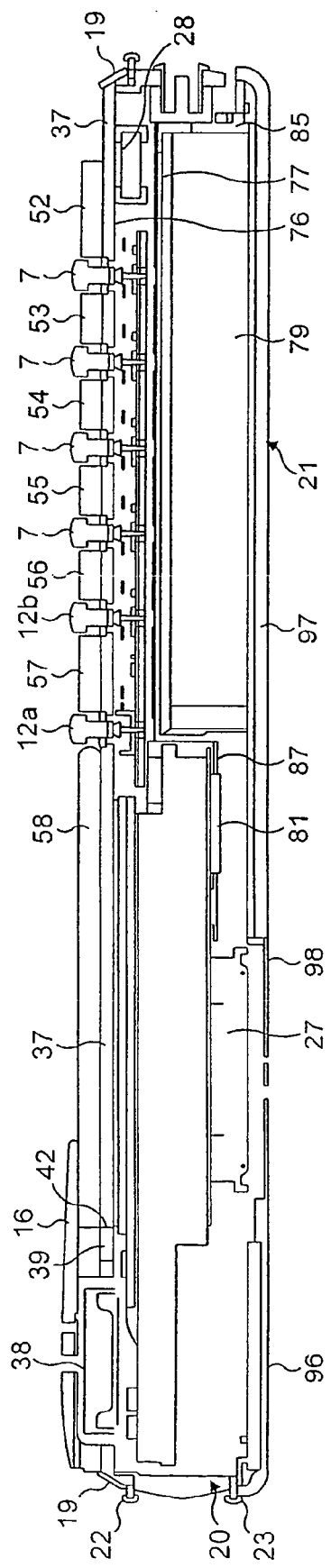
FIG. 9 a longitudinal section through the communication device.
Figure 10:
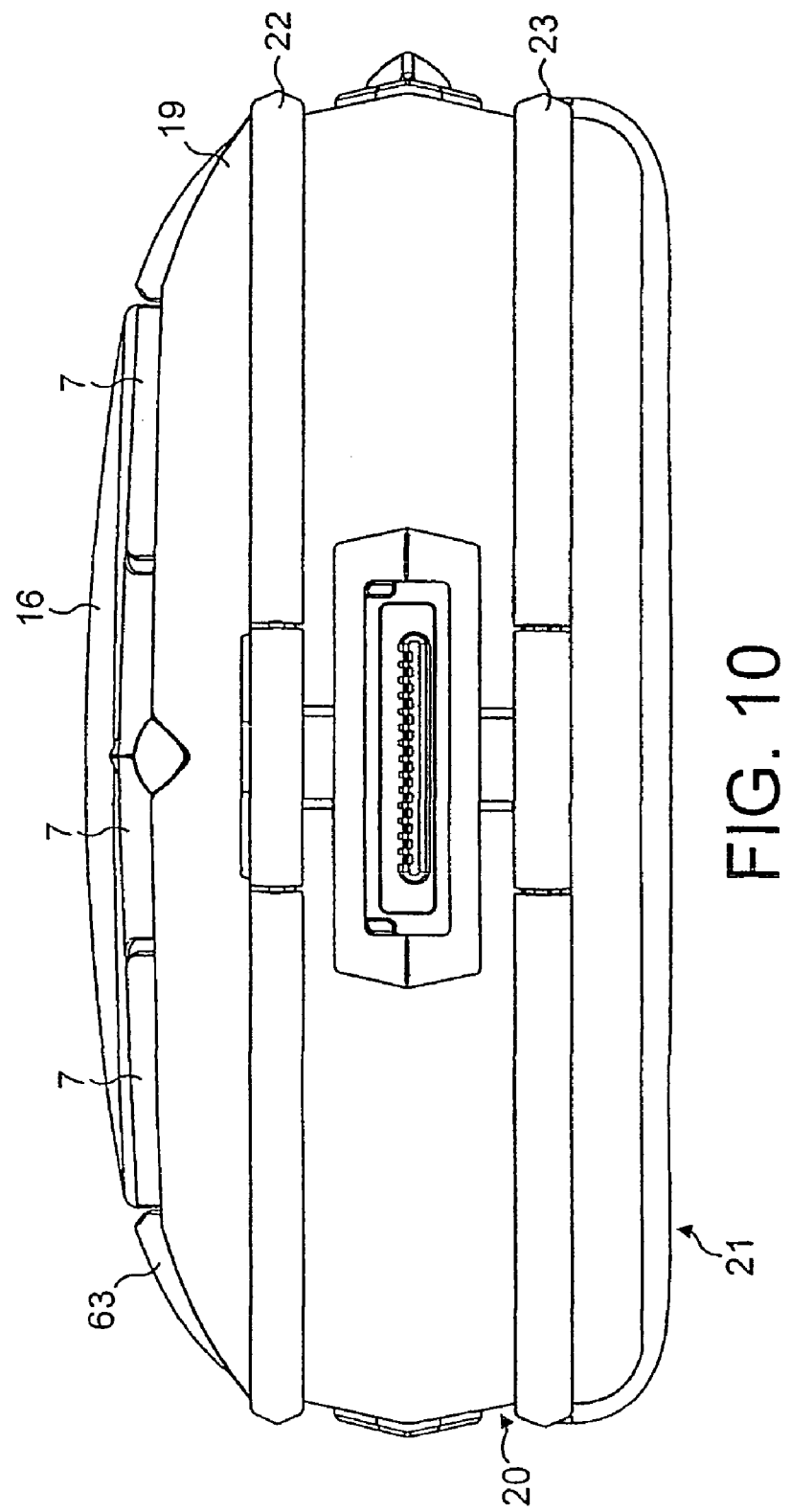
FIG. 10 is a bottom plan view of the device of FIG. 1 (with the chin face protector omitted).

As can be seen in FIG. 6, 7 or 8, a first rail 22 is located in the interface between the side frame element 20 and the front face 3. A second rail 23 is located between the side frame element 20 and the rear face 21. Each rail is trapped between the side frame and another of the casing elements to prevent movement relative to the side casing element in the plane of the side frame. It is also restrained against movement relative to the side frame along the edge of the frame by pins 99 on the front and rear casings engaging in apertures 70 in the rail. The rails made of material substantial enough to suitable strengthen the casing against longitudinal flexing, of flexing along the length of the device. By pinning the rails one to either edge of the side frame, the extent to which compression or extension of the rails needs to occur if the casing is flexed is increased. The centre of the side frame will show the minimum deflection and the top and bottom rails will have a correspondingly increased extension or compression magnified by the distance from the centre. By suitably choosing the materials and construction of the rails, the connection to the side frame and the properties in terms of material and separation distance provided by the side frame, the flexibility of the casing can be inhibited to the required degree.

In addition to providing strength to the casing the form of the rails 22 and 23 of this embodiment also hides the discontinuity between the casing parts from sight and protects vulnerable edges to enhance the durability of the device 1. The rail 22 may be a stamped metal piece 'T' shaped in section extending around the perimeter of the side frame 20. The stem of the 'T' 68 is trapped between the side frame member 20 and the bezel 19 as these two pieces are drawn together on assembly. The stem of the T has apertures 70 that sit over corresponding projections 71 on the side frame 20 member to prevent it from being withdrawn from between the two parts when in position. The top of the T acts as a carrier plate to which an additional extruded piece 72 is soldered or otherwise adhered to provide a seamless finish. The stem could instead be formed from a plastics material in which case an adhesive could be used to attach the extrusion to the stem. In other embodiments, the rail could be formed from a single material. It could be a unitary body or a multiple element member. The shape of the rails is not material provided they give the desired strength to the casing. The bezel 19 overlaying the top rail 22, provides additional strength to the rail and therefore to the casing.

The side frame member 20 in this particular embodiment is a plastic support 73 with an exterior cover 74. The cover 74 may again be a metal sheet or perhaps a wood veneer or another layer such as leather. The bonding agent most suitable for adhering the layer to the plastic frame member 73 will differ depending upon the materials that need to be adhered. For metal to plastic a suitable adhesive is a 2 part epoxy resin or 2 part acrylic adhesive. For metal to metal the adhesive would be a reactive polyurethane film or a two part epoxy resin. Similarly the back cover 21 in this embodiment may have a plastic frame and be covered with for example a leather, wood or perhaps metal veneer. With the flexible veneer materials such as leather, it is preferable for the material to be taut on the frame. This is achieved during the veneering process using conventional techniques.

The constructed casing 2 provides a housing for the printed circuit board 50 holding the engine components 24, and a battery 79. When the device 1 is a radio telephone, a SIM card holder 80 is provided to accommodate a SIM card 81. For operation under some radio protocols this will clearly not be necessary.

The perspex and sapphire is relatively cold to the touch, the material of the pillow 16 can be chosen to be a material that inherently warmer to the touch and less prone to marking than a transparent shiny surface. Materials that are thought to be particularly suitable are wood and leather veneers. The shape of the pillow 16 obscures part of the LCD 25, providing opposing triangular sections 82, 83 that are used to indicate battery capacity and signal strength respectively.

To complete the structure, the casing 2 has a rear cover 21 and internal compartments 84, 85 suitable for retaining the engine 24 the battery 79 and in this embodiment a SIM card 81. The back cover 21 is formed from three pieces 96, 97, 98. The device illustrated, in common with many other radio telephones, advantageously allows access to the battery compartment 85, as the battery 79 may periodically need replacement. In order for the engine 24 to be protected during this activity, the battery 79 is retained in a compartment providing connectors to the engine 24. Along side the battery compartment 85 in this embodiment is the SIM card holder 80. Under protocols where a SIM card 81 is used to hold subscription information, the user may wish to remove the SIM card 81. For this reason it is convenient for the back cover 21 to be removable to expose both the battery 79 and the SIM card 81. The battery compartment 85 and SIM card holder 80 are provided by an internal casing element 87 that is secured to the side frame 20. This may be formed from plastic or one of many other suitable materials. In one embodiment the compartments are formed from stamped metal sheet which may be stainless steel.

In the embodiment described the front 3 and rear casing elements 96, 97, 98 are secured to the side frame 20. A silicon sealant 69 or similar may be extruded around the inside of the back cover 21 to prevent unwanted ingress of dirt and fluid.

The skilled man will realise that the number of parts. and the manner in which they are connected can be changed without departing from the several inventive concepts described. For example, in other embodiments the casing may be held together using other techniques and in other ways.

As well as obscuring exposed edges, the rails 22, 23 provide additional elements for customization as they can be formed from a variety of different materials, in particular different types of precious metal for example gold or platinum. The weight and cost of the rails can be determined by changing the substrate material to be a lightweight material such as plastic if required and providing an extruded ribbon that bridges the discontinuity and is exposed to view that is made from a more appealing material. The rails could instead be solid metal or other material, or to reduce cost and weight could be hollow or perhaps stamped from one material.

The rails protect vulnerable edges of veneered frames from exposure to potentially damaging forces. In doing this unsightly edges are obscured from view. This provides quality and durability in keeping with the overall concept of a retainable casing for a communications device.

Aspects of the invention have been discussed with reference to a radio telephone function. It will be clear to the skilled man that these aspects apply equally to other portable communications devices supporting in addition or as an alternative other functions, such as, amongst others electronic diaries, and electronic notepads.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

The invention claimed is:

1. A casing for a portable communication device, the casing comprising:
   a first casing element, defining at least a portion of a front operating face without defining any portion of a rear face, the operating face being arranged to carry user input elements;
   a second casing element, separated from the first casing element, defining at least a portion of the rear face without defining any portion of the said front operating face; and
   a pair of strengthening members separated by a spacing element, the strengthening members being positioned between the first casing element and the second casing element, and being located against movement relative to the spacing element, such that the casing is strengthened against deflections.

2. A casing according to claim 1 wherein the strengthening members are elongate.

3. A casing according to claim 2 wherein the elongate strengthening members extend around substantially the full extent of the casing.

4. A casing according to claim 1 wherein at least one of the pair of strengthening members has means for mating with the spacing element.

5. A casing according to claim 1 wherein at least one of the strengthening members extends beyond the outside of the casing.

6. A casing according to claim 1 wherein at least one of the strengthening members obscures an edge of a casing element forming part of the casing from view on the exterior of the casing.

7. A casing according to claim 1 wherein the strengthening members are substantially parallel rails.

8. A casing according to claim 1 wherein the strengthening members are interposed between the first and second casing elements.

9. A casing according to claim 1 wherein the first and second casing elements are first and second housing elements for forming a housing; and the casing comprises means for locating the housing elements one relative to another producing, along an intersection between adjacent housing elements, a discontinuity in the exterior of the housing; and wherein at least one of the strengthening members provides means for obscuring an edge of a housing element from view on the exterior of the assembled housing.

10. A casing according to claim 1 wherein the at least one of the pair of strengthening members is seamless along the full extent of at least one edge of a housing.

11. A casing according to claim 1 wherein at least one of the pair of strengthening members has apertures that sit over corresponding projections on a spacing element for locating relative thereto.

12. A portable communication device comprising a casing according to claim 1.

13. A portable communication device according to claim 12 wherein the device is a radio telephone.

14. A casing as claimed in claim 1, wherein the pair of strengthening members separated by a spacing element are located at an intersection between the first and second casing elements.

15. A casing as claimed in claim 1, wherein the casing is a hand-held casing for a hand-held portable communication device.

16. A casing as claimed in claim 1, wherein the pair of strengthening members are fixedly attached to the spacing element.

17. A casing for a portable communication device, the casing comprising:

a first casing element, defining at least a portion of a front operating face without defining any portion of a rear face, the operating face being arranged to carry user input elements;

a second casing element, separate from the first casing element, defining at least a portion of the rear face without defining any portion of the said front operating face; and a first strengthening member contacting the first casing element and extending in a first region positioned between the first casing element and a spacing element, and a second strengthening member contacting the second casing element and extending in a second region positioned between the spacing element and the second casing element, the strengthening members being located against movement relative to the spacing element, such that the casing is strengthened against deflections.

18. A casing according to claim 17, wherein the first and second strengthening members are elongate.

19. A casing for a portable communication device, the casing having a length direction, a width direction and a depth direction, wherein the length is greater than the width and the width is greater than the depth, the casing comprising:

a first casing element defining at least a portion of a front operating face without defining any portion of a rear face, the operating face being arranged to carry user input elements;

a second casing element, separate from the first casing element, defining at least a portion of the rear face without defining any portion of the said front operating face;

first and second strengthening members; and a spacing element, wherein the first casing element and the spacing member are separated in the depth direction by the first strengthening member, the first strengthening member and the second strengthening member are separated in the depth direction by a spacing element and the spacing element and the second casing member are separated in the depth direction by the second strengthening member.

20. A casing according to claim 19, wherein the pair of strengthening members are elongate and extend along the length of the casing.

* * * * *